July 11, 1967     J. J. MEDE     3,330,592
RESILIENT WHEEL

Filed Jan. 27, 1966     2 Sheets-Sheet 1

INVENTOR
JOHN J. MEDE

BY Seidel & Gonda

ATTORNEYS.

July 11, 1967     J. J. MEDE     3,330,592
RESILIENT WHEEL

Filed Jan. 27, 1966     2 Sheets-Sheet 2

INVENTOR.
JOHN J. MEDE
BY
*Seidel & Gonda*

ATTORNEYS.

United States Patent Office 3,330,592
Patented July 11, 1967

3,330,592
RESILIENT WHEEL
John Jarvis Mede, Mifflintown, Pa., assignor to Baldwin-Lima-Hamilton Corporation, Burnham, Pa., a corporation of Delaware
Filed Jan. 27, 1966, Ser. No. 523,324
18 Claims. (Cl. 295—11)

This application is a continuation-in-part of my copending U.S. patent application Ser. No. 414,618 filed Nov. 30, 1964, now Patent No. 3,251,624.

This invention relates to wheels, and more particularly to wheels for electrically motivated railed vehicles such as railroad cars, trolleys, and other vehicles apt to have metal tires.

In utilizing such wheels it is generally necessary to conduct a high amperage electrical current, either alternating or direct, between the electrical equipment and the rail of a rapid transit vehicle. Often it is necessary to conduct such current through or across the insulating material which separates the tire from its center.

It is desirable that the conductor that is utilized be flush with or indented from the side surfaces of the wheel in order that said conductor is protected from damage or malicious tampering. The conductor should be flexible or resilient so as to prevent mechanical vibrations, noise, strain resulting from impact of uneven or worn rails, and shock loads from being transmitted from the tire to the center of the wheel. Furthermore, the conductor should have a low electrical resistance and make good electrical contact with the tire and remainder of the wheel.

It is also important that the conductor should accommodate the relative movement of the tire and the center of the wheel afforded by the resilient material. Furthermore, the conductor should be durable, reliable, economical to fabricate, install and maintain, and have a capacity to sustain electrical overloads.

This invention relates to novel conductors for use in a wheel which meets the requirements set forth above. One embodiment of a conductor of this invention is a coiled wire spring which is inserted in a groove on one or both sides of the wheel between the tire and the center of the wheel. The material from which the coil spring is made must be electrically conductive. It may be steel music wire, stainless steel, bronze, phosphor bronze, beryllium copper, copper, aluminum or other suitable metal or combination of metals. The shape of the wire may be round, square, rectangular, oval, rhombic or otherwise contoured to increase the area in contact or to increase the contact pressure by increasing the section modulus or decreasing the contact area in accordance with the properties desired.

The groove into which the coiled spring is inserted is formed partially in the tire and partially in the center of the wheel. The coiled spring has a diameter which is slightly greater than the width of the groove. The length of the coiled spring is approximately equal to the circumference of the groove. Thus, the spring must be extended to cause the diameter thereof to decrease to a diameter less than the groove width. The spring is then inserted into the groove and allowed to contract in length. The contraction of the spring then causes the outside diameter of the spring to increase and therefore establish further engagement against both sides of the groove. Thereafter, the spring will be still somewhat extended in length and will therefore continue to expand in diameter to exert a pressure against the sides of the groove.

It is readily apparent that the number of effective conductors is equal to twice the number of turns of the wire in the spring. The length of each conductor is approximately 1.58 times the mean diameter of the spring. The pressure of the coiled conductor against the sides of the groove is a function of the modulus of elasticity of the wire material, the proportion of the spring diameter to the width of the groove, the diameter of the wire in the spring, the number of turns per inch of length of the spring, and the diameter of the spring.

Another embodiment of this invention is a conductor which is an undulated member composed of a plurality of undulations or corrugations which is inserted in a groove on one or both sides of the wheel between the tire and the center of the wheel. To prevent electrolysis between the tire and the center of the wheel and the resulting corrosion of the conductor, the preferred metal in this embodiment is 6061-T6 aluminum alloy which has been heat treated. The conductor is preferably flat and therefore provides a sufficiently large cross section so that internal heating of the wheel due to electrical resistance is substantially prevented.

This conductor also has a vertical distance between peaks on the undulations or corrugations which is slightly greater than the width of the groove. The length of the conductor is slightly less than the circumference of the groove. Thus, the conductor must be extended to cause the vertical distance between peaks thereof to decrease to a distance less than the groove width. The conductor is then inserted into the groove and allowed to contract in length. The contraction of the conductor then causes the peak vertical distance to increase and establish secure engagement against both sides of the groove. Thereafter, the conductor will still be somewhat extended in length and the peaks continue to exert a pressure against the sides of the groove. It is to be understood that the vertical distance between peaks herein discussed will be a radial distance with respect to the center of the wheel when the conductor is inserted in the wheel.

It is readily apparent that the number of effective conductors is equal to the number of peaks on the conductor. The pressure of this embodiment of the conductor against the sides of the groove is a function of the modulus of elasticity of the material used, the normal distance between peaks of the conductor with respect to the width of the groove, the thickness of the material used in the production of the conductor, the width of the material used in the production of the flat conductor, and the number of undulations per inch of length of the conductor.

It is an object of the present invention to provide a novel electrical conductor for a wheel.

It is another object of the present invention to provide an electrical conductor for use on a wheel in which the tire is insulated from the center of the wheel.

It is another object of the present invention to provide an electrical conductor which does not protrude beyond the surface of the wheel.

It is another object of the present invention to provide an electrical conductor that is protected from accidental damage, external causes of corrosion, and accidental or malicious tampering.

It is another object of the present invention of provide an electrical conductor for a wheel which is flexible and thus prevents mechanical vibrations, noise, and shock loads from being transmitted from the tire to the center of the wheel.

It is another object of the present invention to provide an electrical conductor which has a low electrical resistance thus preventing internal heating of the wheel by excessively impeding the flow of electrical current.

It is another object of the present invention to provide an electrical conductor which is durable, reliable, economical to fabricate, install and maintain, and has a capacity to sustain electrical overloads.

It is another object of the present invention to provide an electrical conductor which will substantially prevent electrolysis between the tire and the center of the wheel thereof to therefore substantially prevent corrosion of the conductor.

It is another object of the present invention to provide an electrical conductor which has a low electrical resistance and a sufficiently large cross sectional area to length so that internal heating of the wheel is substantially prevented.

Other objects will appear hereinafter.

For the purpose of illustrating the invention, there are shown in the drawings forms which are presently preferred; it being understood, however, that this invention is not limited to the precise arrangements and instrumentalities shown.

Figure 1:
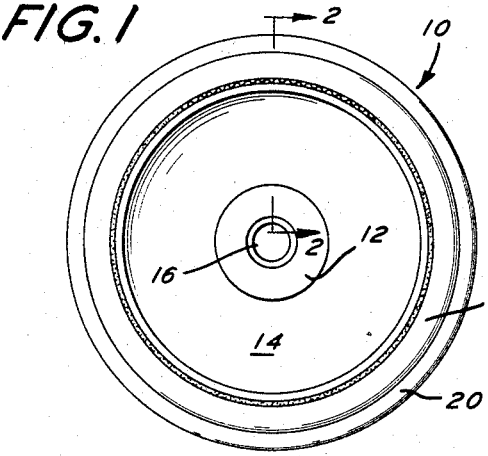
FIGURE 1 is a side elevation view of the wheel of the present invention.
Figure 7:
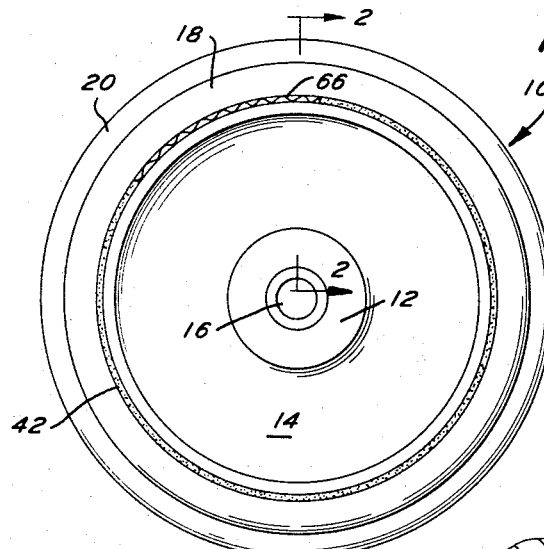
FIGURE 7 is a side elevation view of another embodiment of the conductor of the present invention.
Figure 9:
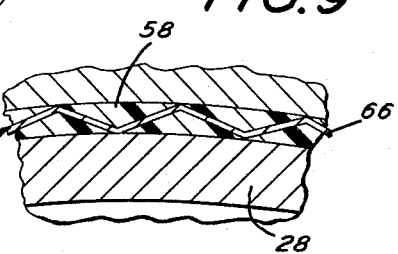
FIGURE 9 is a partial sectional view taken along line 3—3 of FIGURE 8.

In FIGURES 1 and 7 there is illustrated a railroad or other rail engaging wheel in accordance with the present invention designated generally as 10.

The wheel 10 includes a hub 12 having a bore 16 for mounting the same on an axle not shown. The periphery of the hub 12 merges into a thin dish-shaped web 14. The hub 12 and web 14 may be made from metal which is electrically conductive such as steel, bronze, aluminum, or other suitable metal or combination of metals. The wheel 10 is provided with a tire 18 made form a hard metal such as steel or any suitable alloy. The tire 18 is also electrically conductive.

Tire 18 is provided with a radially outwardly directed flange 20 on its outer periphery 22. Periphery 22 is a generally smooth surface with a slight taper 23 on the side remote from flange 20. A suitable taper would be one inch in twenty inches. As shown more clearly in FIGURE 2, the inner face 24 of the hub 12 projects farther beyond the inside face of the tire 18 than the outer face 26 on the hub projects beyond the outside face of tire 18. The wheel can be constructed in a manner such that the outer face may project, be flush, or be recessed with respect to the face of tire 18.

Figure 2:
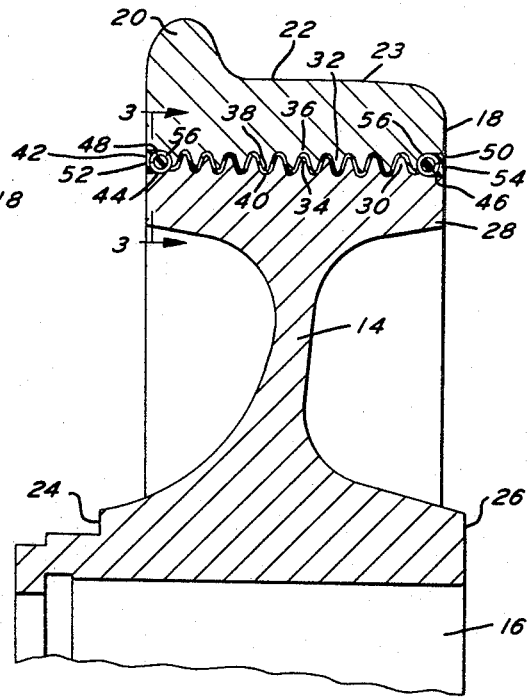
FIGURE 2 is a sectional view taken along line 2—2 in FIGURE 1.
Figure 4:
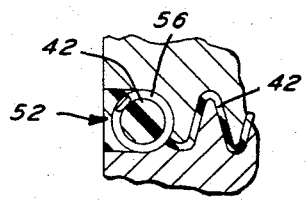
FIGURE 4 is a partial sectional view disclosing a novel conductor in accordance with this invention.
Figure 3:
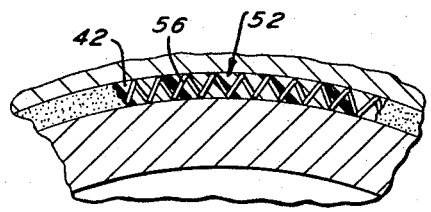
FIGURE 3 is a partial sectional view taken along line 3—3 in FIGURE 2.

As shown more clearly in FIGURE 2, the outer periphery of the web 14 merges into a rim 28 having a width corresponding to that of the tire 18. The outer periphery of the rim 28 is provided with threads 30. The inner periphery of the tire 18 is provided with mating threads 32. The threads 30 and 32 may be modified V threads as shown. Threads 30 include rounded crests 34 juxtaposed to rounded roots 36 of the threads 32. Threads 32 include rounded crests 38 juxtaposed to rounded roots 40 of the threads 30.

The threads 30 and 32 are spaced from each other to provide a gap. The distance from crest to crest may be equal to or greater than 5/16 of an inch but less than or equal to 7/16 inch for a twenty-eight inch diameter wheel; with the distance between side faces of threads 30 and 32 being one-sixteenth inch. The structural inter-relationship between the rim 28 and the tire 18 is provided to more than double the juxtaposed area and to facilitate the provision of a layer of flexible or resilient sound absorbing material 42. The type of construction described effects an optimum balance of the stresses in the resilient material resulting from the shear loads due to acceleration and deceleration. It also effects a balance in the combination of compression, tension, and shear loads due to radial loads imposed by the weight on the axle. Finally it provides an optimum balance in the compression loads in axial direction from the forces acting in the web 14. The design described results in stresses in the resilient material which in effect extends the life of said material.

Material 42 is in shear due to acceleration and deceleration forces on the wheel and in tension, compression and shear due to the weight of the load on the wheel and also due to side forces on the flange of the wheel, in addition to absorbing high frequency vibration and noise between the tire 18 and rim 28. The material 42 may be any one of a variety of suitable elastomer materials such as rubber, silicone rubber, polysulphide compositions, flexible epoxy resins, and polyurethanes, with or without appropriate fillers, etc.

Figure 5:
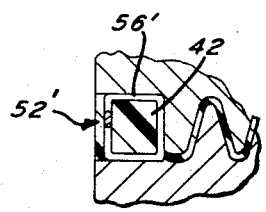
FIGURE 5 is a partial sectional view similar to FIGURE 4 but illustrating another embodiment of the conductor of the present invention.
Figure 6:
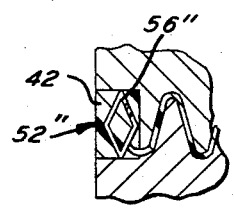
FIGURE 6 is a partial sectional view similar to FIGURE 5 but illustrating another embodiment of the conductor of the present invention.
Figure 8:
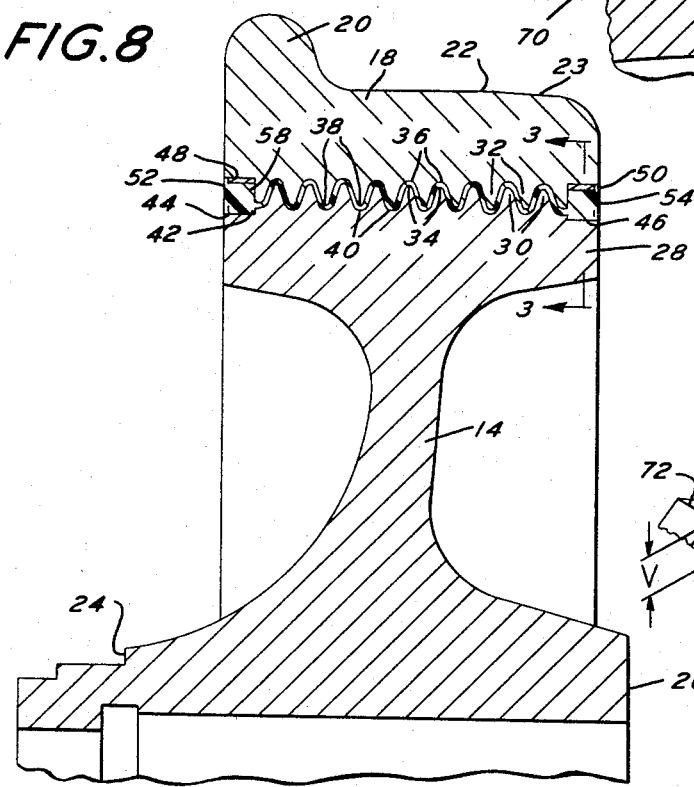
FIGURE 8 is a section view taken along line 2—2 in FIGURE 7.
Figure 10:
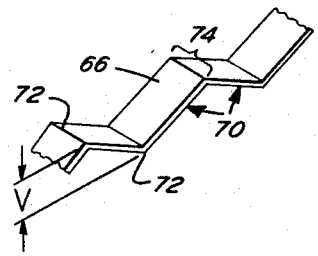
FIGURE 10 is a perspective view showing a portion of one embodiment of the novel conductor of this invention.

The rim 28 is provided with channels 44 and 46 at its periphery. The tire 18 is provided with channels 48 and 50 on its innermost periphery. When the wheel 10 is assembled, i.e., by threading the tire onto the rim 28, the channels 44 and 48 and 46 and 50 cooperate to form grooves 52 and 54 respectively. The grooves 52 and 54 may be semicircular in shape as seen in FIGURE 2 or rectangular in shape as shown in FIGURES 5, 6, and 8.

Referring now particularly to FIGURES 1-4, the grooves 52 and 54 are each adapted to receive a coiled helical wire spring conductor 56. The grooves 52 and 54 are deep enough to accommodate the spring 56 without having the spring 56 protrude beyond the surface of the wheel.

The spring 56 conducts electricity between the tire and the center of the wheel. It is not necessary that a spring 56 be provided on both sides of the wheel 10. However, to double the electrical conductivity, it is generally desirable to have the conductors on each side of the wheel. The number of effective conductors is equal to twice the number of turns of wire in the spring. The spring may be made of steel music wire, bronze, copper, aluminum or other suitable metal or combination of metals.

Since the groove 52 and the groove 54 are identical in construction, only the cooperation of the spring 56 with the groove 52 will be described in detail. It is to be understood that the same relationship exists between the spring 56 and the groove 54. The outside diameter of the spring 56 is slightly greater than the width of the groove 52 and therefore spring 56 must be extended to decrease the diameter thereof to less than the groove width. The spring 56 is then inserted into the groove 52 and allowed to contract. This allows the spring to increase in outside diameter and to press firmly against both sides of the groove. The spring is still somewhat extended in length, and therefore provides a diametric force against the sides of the groove. The pressure of the spring against the sides of groove 52 is a function of the modulus of elasticity of the spring material, the proportion of the coil diameter to the width of the groove, the diameter of the wire in the coil, the number of turns per inch of spring, and the diameter of the spring.

After the spring 56 has been positioned within the groove 52 it is completely enclosed by bonding the resilient elastomeric material 42 in and around the spring. Thus the spring 56 is protected from exposure to moisture, air and industrial fumes, dirt, salt, sand, stones and other demagaing and corrosive materials. Enclosing the spring 56 also prevents the spring from becoming displaced or dislodged due to vibration, accidental impact or blows, and from malicious tampering and sabotage.

The groove 52 preferably is filled with the same resilient material 42 used between the tire and the center of the wheel, and is filled at the time as the wheel. If desired the groove may be filled with a different resilient material than the material 42.

In FIGURES 5 and 6 there are illustrated other embodiments of the conductor of this invention. The grooves 52' and 52" in FIGURES 5 and 6 are substantially similar to the grooves illustrated in FIGURES 2, 3 and 4. However, grooves 52' and 52" are rectangular rather than semi-circular. The helical conductor 56' is rectangular in shape and is utilized to increase the area of the conductor which is in contact with the tire 18 and the center of the wheel. The helical spring 56" shown in FIGURE 6, has less area in contact with tire 18 and the center of the wheel but has greater contact pressure as a result of the decreased contact area. It is obvious that the shape and properties of the conductor of this invention may be varied according to the properties desired without departing from the spirit and scope of this invention.

The design of the foregoing described wheel having a conductor or conductors (as shown in FIGURES 1–6) imbedded therein is such that if the diameter of the tread of the wheel is 30 inches, an appropriate mean diameter of the groove may be about twenty-seven and three-sixteenths inches; the distance from the surface to the bottom of the groove may be seven-sixteenths inch; and the width of the groove may be eleven-thirty seconds inch. The diameter of the coiled spring conductor and the width of the groove is so dimensioned as to create an interference fit between the three parts; tire, conductor and center of the wheel; so that the wire spring conductor is distorted from its normal shape and therefore presses against the tire and the center of the wheel. An appropriate diameter of the wire may be one-thirty second of an inch.

Referring now particularly to FIGURES 7–10, the grooves 52 and 54 have received therein a flat conductor 66. The grooves 52 and 54 are deep enough to accommodate the undulating or corrugated planar members 66 without having the members 66 protrude beyond the surface of the wheel.

The members 66 conduct electricity between the tire and the center of the wheel. It is not necessary that a member 66 be provided on both sides of the wheel. However, to double the electrical conductivity, it is generally desirable to have the conductor on each side of the wheel. Preferably the flat undulated conductor is made of a heat treated aluminum alloy. By way of example the metal may be 6061–T6 aluminum alloy. Other materials such as beryllium, copper, bronze, and any other suitable metal or combination of metals may be used.

The conductor 66 is composed of a plurality of undulating sections 70. The flat conductor 66 makes a plurality of line contacts 74 provided by the peaks 72 on the undulations thereof. The peaks 72 may be rounded or V-shaped without departing from the spirit and scope of this invention. The line contacts 74 insure good electrical connection between the conductor and the surface with which it is in contact. In the preferred embodiment, the vertical distance V (see FIGURE 10) between peaks 72 of the conductor in normal unextended condition is substantially 7/16 of an inch and the length of a line of contact 74 is substantially 3/8 of an inch. The number of effective conductors is equal to the number of lines of contact of the conductor with either channel in the groove.

Since the groove 52 and the groove 54 are identical in construction, the cooperation of the conductor 66 with the groove 52 will be described in detail. It is to be understood that the same relationship exists between the conductor 66 and the groove 54. The vertical distance V between the peaks 72 of the conductor 66 is slightly greater than the width of the groove 52 and therefore the conductor 66 must be extended to decrease the distance between peaks 72 to less than the groove width. The conductor 66 is then inserted into the groove 52 and allowed to contract. This allows the distance between the peaks 72 of the conductor 66 to increase and to press firmly against both sides of the groove 52. The conductor is still somewhat extended in length, and will therefore continue to press against the sides of the groove. The pressure of the conductor against the sides of the groove 52 is a function of the modulus of elasticity of the conductor material, the proportion of the distance between peaks 72 to the width of the groove, the width of the conductor material, the number of peaks per inch of conductor, and the thickness of the conductor material.

After the conductor 66 has been positioned within the groove 52 it is completely enclosed by bonding elastomeric material 58 around the conductor. The elastomeric material 58 may be any one of a variety of suitable elastomer materials such as rubber, silicone rubber, polysulphide compositions, flexible epoxy resins, and polyurethanes, with or without appropriate fillers, etc. The material 58 may be the same as the material 42. The material 58 is preferably bonded at the same time that the material 42 is bonded but it may be bonded in a subsequent operation. Due to the shape of the flat conductor, the elastomeric material freely flows therearound thereby permanently retaining the conductor in its desired position. The conductor 66 is protected from exposure to moisture, air and industrial fumes, dirt, salt, sand, stones and other damaging and corrosive materials. Enclosing the conductor 66 also prevents it from becoming displaced or dislodged due to vibration, accidental impact or blows, and from malicious tampering and sabotage.

The design of the foregoing described wheel, shown in FIGURE 7, having a conductor or conductors imbedded therein is such that if the diameter of the tread of the wheel is 30 inches, an appropriate mean diameter of the groove may be about 27 5/16 inches; the distance from the surface to the bottom of the groove may be 7/16 inch; and the width of the groove may be 7/16 inch. The distance between peaks of the spring conductor and the width of the groove is so dimensioned as to create an interference fit between the three parts; tire, conductor and center of the wheel; so that the conductor is distorted from its normal shape and therefor presses against the tire and the center of the wheel. An appropriate thickness of the conductor may be .05 inch. The vertical distance V between the peaks of the conductor may be greater than 7/16 inch. The preferable width of the material is .375 inch. The length of an undulating section 70 may be 1.25 inches. The ratio of cross section to the length of a single conductor defined by two peaks of an undulation is preferably approximately .02. The area/length ratio of material utilized substantially prevents internal heating of the wheel which is caused by impeding the flow of electrical current between the tire and the center of the wheel. The yield strength of the material utilized is perferably 40,000 pounds per square inch. In the preferred embodiment, the conductor is composed of 6061–T6 aluminum alloy which has been heat treated. The heat treated aluminum substantially prevents electrolysis between the tire and the center of the wheel and therefore substantially prevents corrosion which may occur as a result of such electrolysis.

The present invention may be embodied in other specific forms without departing from the spirit or essential attributes thereof and, accordingly, reference should be made to the appended claims, rather than to the foregoing specification as indicating the scope of the invention.

I claim:

1. A wheel comprising a center portion and an annular outer portion, an elongated spring member retained between said center portion and said outer portion and disposed annularly of said center portion, opposite sides of said spring being in contact with said center portion and said outer portion to electrically connect said portions, said center and said outer portion being otherwise electrically insulated.

2. A wheel as set forth in claim 1 comprising at least one groove between said center portion and said outer portion, said spring member being retained in said groove, wherein said groove and spring traverse the entire periphery of said inner portion of said wheel and said spring is imbedded in elastomeric material.

3. A wheel comprising a center portion, said center portion having a screw thread defining its outer periphery, at least one annular channel in said outer periphery, an annular tire portion, said tire portion having a screw thread defining its inner periphery, said screw thread being complementary to and of greater diameter than said screw thread of said center portion, a radial clearance space between said screw threads, at least one annular channel in said inner periphery of said tire portion, said last mentioned annular channel being juxtaposed to said annular channel in said outer periphery of said center portion to thereby form a groove, an elongated spring member, said spring member being retained in said annular groove and being in electrical contact with said center portion and said tire portion.

4. A wheel as set forth in claim 3 including elastomeric material in said radial clearance space for maintaining said center portion and said tire portion in spaced relation, said spring member being helical, and said helical spring member being imbedded in said elastomeric material.

5. A wheel as set forth in claim 4 wherein said helical spring member, when retained in said annular groove, is extended in length.

6. A wheel as set forth in claim 5 wherein said helical spring member is wholly contained within said groove and said spring does not protrude beyond the outer surface of said wheel.

7. A wheel comprising a center portion, said center portion having a screw thread defining its outer periphery, two channels formed in said outer periphery, an annular tire portion, said tire portion having a screw thread defining its inner periphery, said screw thread being complementary to and of greater diameter than said screw thread of said center portion, a radial clearance space between said screw thread portions, two annular channels formed in said inner periphery of said tire portion, said last mentioned annular channels being juxtaposed to said two annular channels in said outer periphery of said center portion to form two grooves, a pair of elongated spring members, said spring members being retained by said annular grooves and being in electrical contact with said center portion and said tire portion, and elastomeric material in said radial clearance space for maintaining said center portion and said tire portion in spaced relation, said spring members being imbedded in said elastomeric material.

8. A wheel as set forth in claim 7 wherein said springs are helical, and said springs, when retained in said annular grooves are extended in length and thereby continue to expand against the channels in said center portion and said tire portion.

9. A wheel comprising a center portion and an annular outer portion, a flat conductor retained between said center portion and said outer portion and disposed annularly of said center portion, said conductor beting formed of a plurality of corrugations, said corrugations having a plurality of peaks thereon, said flat conductor being alternately in electrical contact with said center portion and said outer portion, said center portion and said outer portion being otherwise electrically isolated.

10. A wheel comprising a center portion, said center portion having a screw thread defining its outer periphery, at least one annular channel in said outer periphery, an annular tire portion, said tire portion having a screw thread defining its inner periphery, said screw thread being complementary to and of greater diameter than said screw thread of said center portion, a radial clearance space between said screw threads, at least one annular channel in said inner periphery of said tire portion, said last-mentioned annular channel being juxtaposed to said annular channel in said outer periphery of said center portion to thereby form a groove, an elongated flat planar conductor, said flat planar conductor being retained in said annular groove and being in electrical contact with said center portion and said tire portion, including elastomeric material in said radial clearance space for maintaining said center portion and said tire portion in spaced relation, said flat conductor member comprising a plurality of undulations and said flat conductor being imbedded in said elastomeric material.

11. A wheel as set forth in claim 10, wherein said flat conductor, when retained in said annular groove, is extended in length.

12. A wheel as set forth in claim 11 wherein said flat conductor is wholly contained within said groove and said flat conductor does not protrude beyond the outer surface of said wheel.

13. A wheel as set forth in claim 12 wherein said flat conductor is composed of heat treated aluminum so that electrolysis between said tire and said center portion is substantially prevented.

14. A wheel as set forth in claim 13 wherein a plurality of peaks is provided by the undulations of the flat conductor, and said peaks being in pressing engagement with said channels which form said groove, the shape of said flat conductor permitting elastomeric material to freely flow therearound.

15. A wheel comprising a center portion, said center portion having a screw thread defining its outer periphery, two channels formed in said outer periphery, an annular tire portion, said tire portion having a screw thread defining its inner periphery, said screw thread being complementary to and of greater diameter than said screw thread of said center portion, a radial clearance space between said screw thread portions, two annular channels formed in said inner periphery of said tire portion, said last-mentioned annular channels being juxtaposed to said two annular channels in said outer periphery of said center portion to form two grooves, a pair of flat conductors, said conductors being formed of a plurality of undulations, said undulations having a plurality of peaks thereon, said flat conductors being retained by said annular grooves and being in electrical contact with said center portion and said tire portion, said peaks of said flat conductor being in pressing engagement with said center portion and said tire portion, and elastomeric material in said radial clearance space for maintaining said center portion and said tire portion in spaced relation, said flat conductor being imbedded in said elastomeric material.

16. A wheel as set forth in claim 15 wherein said flat conductor, when retained in said annular grooves, is stretched in length and thereby the peaks thereof continue to expand against the channels in said center portion and said tire portion.

17. A wheel as set forth in claim 16 wherein said conductor has a thickness of approximately .05 inch, the radial distance between the peaks of the conductor being approximately 7/16 inch, the width of the flat conductor is approximately .375 inch, and the ratio of cross section to the length between two peaks of the conductor is approximately .02.

18. A wheel as set forth in claim 17 wherein said conductor is composed of heat treated aluminum having a yield strength of approximately 40,000 pounds per square inch.

References Cited

UNITED STATES PATENTS

| 623,883 | 4/1899 | Cameron | 295—11 |
| 2,659,622 | 11/1953 | Watter | 295—11 |

ARTHUR L. LA POINT, *Primary Examiner.*

C. W. HAEFELE, R. A. BERTSCH,

*Assistant Examiners.*